(12) United States Patent
Paik et al.

(10) Patent No.: US 7,573,156 B2
(45) Date of Patent: Aug. 11, 2009

(54) APPARATUS FOR AND METHOD OF CONNECTING A POWER SOURCE TO A DEVICE

(75) Inventors: Namwook Paik, Acton, MA (US); Bruce Long, Pelham, NH (US)

(73) Assignee: American Power Conversion Corporation, West Kingston, RI (US)

( * ) Notice: Subject to any disclaimer, the term of this patent is extended or adjusted under 35 U.S.C. 154(b) by 398 days.

(21) Appl. No.: 11/315,659

(22) Filed: Dec. 22, 2005

(65) Prior Publication Data

US 2007/0145827 A1   Jun. 28, 2007

(51) Int. Cl.
H02J 7/00 (2006.01)
H02J 9/00 (2006.01)
(52) U.S. Cl. ..................... 307/66; 439/924.1
(58) Field of Classification Search .............. 307/81, 307/66; 439/924.1
See application file for complete search history.

(56) References Cited

U.S. PATENT DOCUMENTS

| | | | |
|---|---|---|---|
| 5,174,787 A | 12/1992 | Shirai et al. | |
| 5,216,371 A | 6/1993 | Nagai | |
| 5,384,492 A | 1/1995 | Carlson et al. | |
| 5,432,916 A | 7/1995 | Hahn et al. | |
| 5,434,752 A | 7/1995 | Huth et al. | |
| 5,530,810 A | 6/1996 | Bowman | |
| 5,587,685 A | 12/1996 | Johansson | |
| 5,619,076 A | 4/1997 | Layden et al. | |
| 5,821,636 A | 10/1998 | Baker et al. | |
| 6,204,574 B1 | 3/2001 | Chi | |
| 6,310,783 B1 | 10/2001 | Winch et al. | |
| 6,738,915 B1 * | 5/2004 | Mott et al. | 713/330 |
| 6,857,887 B1 | 2/2005 | Belson et al. | |
| 7,202,576 B1 * | 4/2007 | Dechene et al. | 307/66 |
| 2004/0201368 A1 | 10/2004 | Bobbitt et al. | |

* cited by examiner

Primary Examiner—Robert L. DeBeradinis
(74) Attorney, Agent, or Firm—Lando & Anastasi, LLP.

(57) ABSTRACT

According to one aspect of the invention, an uninterruptible power supply includes UPS circuitry, a power source adapted to couple to the UPS circuitry, a first contact, a second contact, and a third contact. The first contact, the second contact, and the third contact are adapted to couple the UPS circuitry to the power source. In a first stage of connection of the UPS circuitry and the power source, the first contact and the second contact are employed in a first circuit. In a second stage of connection of the UPS circuitry and the power source, the first contact and the third contact are employed in a second circuit, and the second contact and the third contact are employed in a third circuit.

48 Claims, 3 Drawing Sheets

APPARATUS FOR AND METHOD OF CONNECTING A POWER SOURCE TO A DEVICE

BACKGROUND OF INVENTION

1. Field of Invention

At least one embodiment of the invention relates to an uninterruptible power supply ("UPS"), and in particular, to a UPS that includes contacts for connecting the UPS to a power source.

2. Discussion of Related Art

Typically electrical and electronic devices are connected to one or more sources of electrical power that provide energy for their operation, e.g., either AC power or DC power. In the case of the UPS, the power source may include a source of backup power (e.g., a battery) that allows a load connected to an output of the UPS to continue to operate, for example, upon interruption of an AC source that is also connected to the UPS and which under normal circumstances supplies power to the load. The source of backup power may or may not provide energy for normal UPS operation. Thus, many UPS topologies can also operate in at least a "limited" fashion without a connection to the source of backup power provided that at least one source of power is connected to the UPS, e.g., the AC source, to provide a source of power for internal UPS circuitry.

With advances in analog and digital electronics, many sources of electrical power (including portable power sources) now include signal circuitry that may, for example, allow information to be communicated between the power source and a device connected to it. Signal circuits may include one or more of analog circuits, digital circuits, or a combination of analog and digital circuits. Embodiments of signal circuits may include processors. Signal circuits can operate as sensing circuits, control circuits, logic circuits, communication circuits, or any combination of these circuits. Common examples include the communication of signals corresponding to the charge-status, the temperature and other operating parameters of the power source. The device connected to the power source can employ the information provided by the signal circuit to control operation of the power source and/or the device. The information can also be employed to provide feedback to a user of the device, for example, to provide audible alarms and/or to generate feedback that is accessible via a user interface (e.g., an electronic display).

Generally, power sources are connected to devices using connectors that include a fixed number of contacts. The connectors may be included, for example, in a plug affixed to the end of an electrical cord, in a socket included in the power source and/or device, and in an edge connector of a printed circuit board. When the contacts included with the power source are connected to the corresponding contacts included with the device, a conductive path is formed between the power source and the device. In the case of a UPS, for example, a power circuit and a signal circuit included in the UPS may be connected to a power circuit and a signal circuit, respectively, included in the power source.

Historically, very few contacts were required to connect a power source to a device because only two to four conductors and a ground were necessary, in general, to connect the power circuit to the device. Some example power source/device connections include: the connection of a DC power source to a device using two conductors (e.g., a positive conductor and a negative conductor); the connection of a single phase AC power source to a device using one phase conductor, one neutral conductor, and a ground; and the connection of a three-phase wye connected source to a device using three separate phase conductors, a neutral conductor, and a ground.

The connections identified above are the connections that might be used, for example, when connecting the power circuitry of a UPS to a power source. Because signal circuitry generally operates at a reduced voltage relative to the operating voltage of the power circuitry, a limited number of available contacts (if any) included in the connectors used to connect the power source to the device are traditionally available for use with any signal circuitry. As a result, the traditional approaches to connecting a power source and a device do not provide much flexibility for topologies that require the connection of a plurality of circuits (e.g., power circuitry, signal circuitry, etc.).

A current limiting circuit (e.g., a precharge circuit) provides another example of a circuit that typically requires a connection between the power source and the device circuitry. Often, the device that is being connected to the power source includes a large capacitance. The capacitance can cause a large inrush current when the device is connected to the source of power and the capacitance is charged. The inrush current may result in an arc that can damage the contacts of the connector and/or alarm a user who is making the connection. Accordingly, current limiting circuitry (e.g., a precharge circuit) is employed to reduce the amount of inrush current when the device is connected to the source of power, for example, by charging the capacitance more slowly. Where a current limiting circuit is employed, the connection between the power source and the device may be completed in stages where, for example, the current limiting circuit is completed before the power source is fully connected to the device. The current limiting circuit is then bypassed when the power source and the device are fully connected.

The connection of battery-supplied sources of power may contribute to the amount of inrush current seen by a device when it is connected to the source of battery power because of the low impedance of the batteries.

In addition, the contacts of the connectors employed in signal circuitry generally operate at a much reduced voltage relative to the power and precharge circuits because the signal circuitry generally operates at a voltage that is significantly less than the voltage provide by the source of power. As a result, separate contacts in the connector are often used to complete the signal circuitry.

The limited quantity of conductors included in traditional approaches for connecting the power source to the device limits the ability to include connections for both current limiting circuitry and signal circuitry in a single connector. For example, in one such approach, a UPS includes a precharge circuit, power circuitry that is employed when a power source is fully connected to the UPS, and a signal circuit. Prior approaches, however, are not effective in employing the limited number of contacts provided because at least two contacts are generally required to complete the power circuitry, at least one additional contact is required to complete the signal circuit and at least one additional contact is required to complete the precharge circuit.

Commonly assigned pending U.S. patent application Ser. No. 10/690,726 entitled "Uninterruptible Power Supply Systems and Enclosures," filed Oct. 22, 2003, describes one approach that employs a separate contact for each of the signal circuit and the precharge circuit. The entire contents of U.S. patent application Ser. No. 10/690,726 are herein incorporated by reference.

SUMMARY OF INVENTION

At lease one embodiment of the invention, employs a contact for use in both a precharge circuit and a signal circuit.

According to one aspect of the invention, an uninterruptible power supply includes UPS circuitry, a power source adapted to couple to the UPS circuitry, a first contact, a second contact, and a third contact. The first contact, the second contact, and the third contact are adapted to couple the UPS circuitry to the power source. In a first stage of connection of the UPS circuitry and the power source, the first contact and the second contact are employed in a first circuit. In a second stage of connection of the UPS circuitry and the power source, the first contact and the third contact are employed in a second circuit, and the second contact and the third contact are employed in a third circuit.

In one embodiment, the third circuit is adapted to provide a signal representative of at least one parameter of the power source. In another embodiment, the first circuit includes a current limiting circuit. In a version of this embodiment, the UPS circuitry includes a capacitor and the current limiting circuit is a precharge circuit adapted to precharge the capacitor. In a further embodiment, the power source includes a battery. In yet another embodiment, the first circuit includes a voltage clamping device.

According to another aspect, the invention provides a method of coupling a power source to an uninterruptible power supply. A first contact and a second contact of the power source are coupled to the uninterruptible power supply at a first stage of connection to form a first circuit. The first contact, the second contact, and a third contact of the power source are coupled to the uninterruptible power supply at a second stage of connection to form a second circuit and a third circuit. At the second stage of connection, the first contact and the third contact are employed in the second circuit, and the second contact and the third contact are employed in the third circuit. According to one embodiment, the first circuit provides power to the uninterruptible power supply. In a further embodiment, the current flow is limited in the first circuit. According to yet another embodiment, the power source includes a battery that is included in a portable battery pack.

In yet another aspect of the invention, an uninterruptible power supply includes UPS circuitry, a power source adapted to couple to the UPS circuitry and means adapted to couple the power source to the UPS circuitry. The means includes a first contact, a second contact and a third contact. In a first stage of connection of the UPS circuitry and the power source, the first contact and the second contact are employed in a first circuit. In a second stage of connection of the UPS circuitry and the power source, the first contact and the third contact are employed in a second circuit, and the second contact and the third contact are employed in a third circuit. According to one embodiment, the means for coupling are included in an electrical cord.

In still another aspect of the invention, a battery pack is adapted to couple to a UPS. The battery pack includes a first contact, a second contact, and a third contact adapted to couple the battery pack to the UPS. In a first stage of connection of the battery pack and the UPS, the first contact and the second contact are employed in a first circuit. In a second stage of connection of the battery pack and the UPS, the first contact and the third contact are employed in a second circuit, and the second contact and the third contact are employed in a third circuit. According to one embodiment, the battery pack includes a sensing device adapted to provide information concerning a status of the battery pack. In another embodiment, the battery pack is a portable battery pack. In a further embodiment, the battery pack includes a voltage clamping device. In a version of this embodiment, the voltage clamping device conducts current at the first stage of connection and does not conduct current at the second stage of connection.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
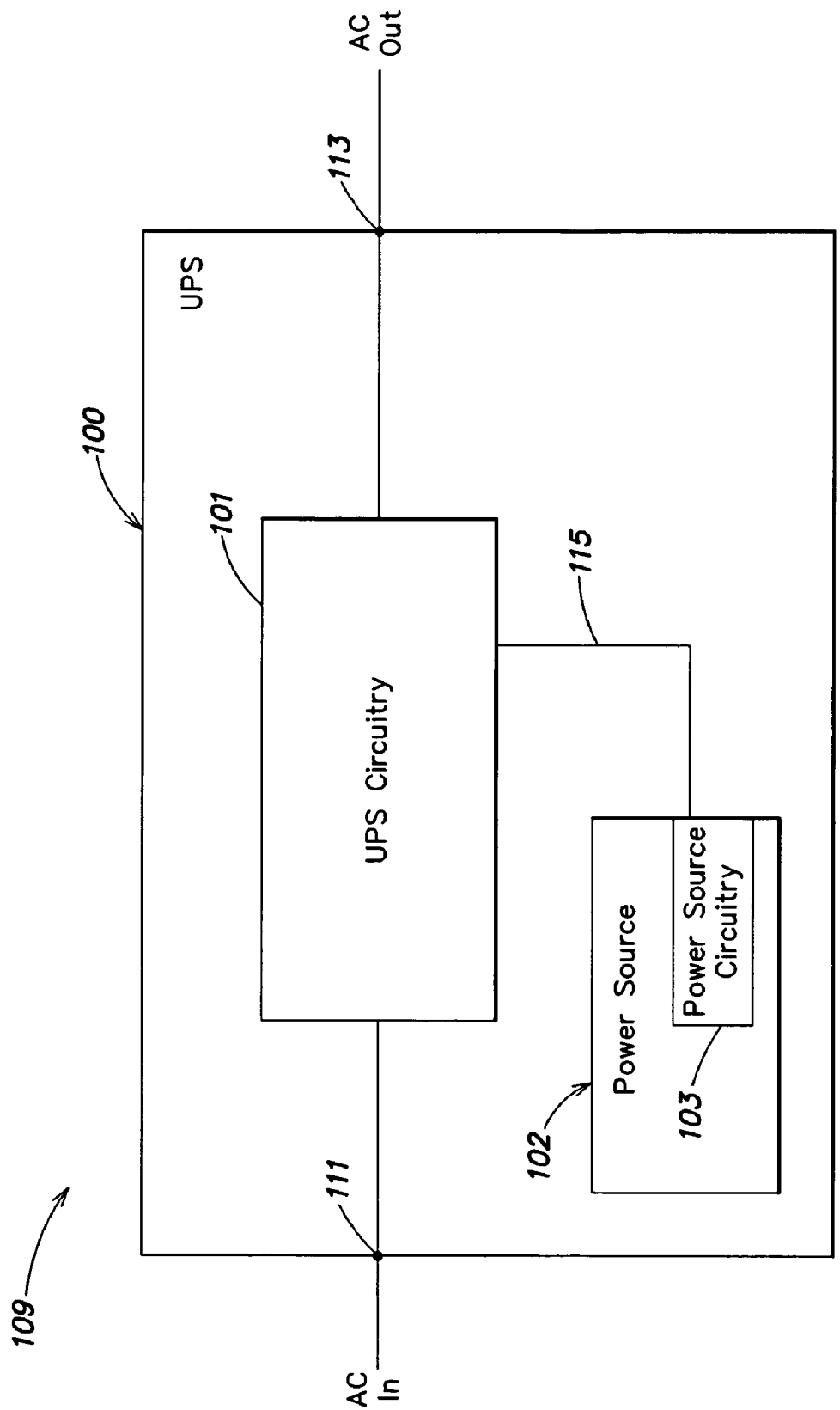
FIG. 1 is a block diagram of a UPS in accordance with an embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Many connectors for power sources may include only two or three contacts, and as a result, it is important to use the limited number of contacts provided in such a connector efficiently. As described above, prior approaches do not efficiently employ the contacts provided in power-source and other types of connectors.

The term "contact" refers to a conducting element that provides a current path when it makes contact with another conducting element. A contact may be fixed or moveable. In addition, a plurality of contacts may be included in a connector. Some commonly used types of contacts include; bayonet-style contacts, pin and socket contacts, wiping spring beam contacts and the like. As will be recognized by those of ordinary skill in the art, the invention is not limited to use with any particular contact-type and embodiments of the invention may be employed with various contact-types including the contact-types listed here and other contact-types. Contacts are often provided in the form of a pin in a first connector adapted to engage a corresponding pin in a second connector that may, for example, include a socket. For example, assignee's co-pending application Ser. No. 10/690,726, in one embodiment, includes contacts in the form of blades and corresponding sockets.

In the embodiment shown in FIG. 1, the device 100 includes an input 111, an output 113, a power source 102 and circuitry 101. The power source 102 includes power source circuitry 103. The power source circuitry 103 is connected to the circuitry 101 by a connection 115, which may include multiple contacts. According to one embodiment, the power source 102 is included in the device 100 when the power source circuitry 103 is connected to the circuitry 101. In one embodiment, the device 100 is a UPS and the circuitry 101 is UPS circuitry. The device 100 need not be a UPS but may be some other electronic device such as a laptop computer, a camcorder, or a cell phone. In versions of this embodiment, the power source circuitry 103 is included in a DC power source (e.g., a battery pack) used with the device 100.

In one embodiment, the device 100 is a UPS that, during normal operation, receives AC line power at the input 111 and supplies AC line power at the output 113. When AC line power is not available at the input 111, power supplied from the power source 102 is delivered to the output 113 via the UPS circuitry 101. For example, where the power source 102 is a DC power source, the DC power may be converted to AC by the UPS circuitry 101 before being supplied to the output 113.

According to one embodiment, the UPS 100 is an off-line UPS that includes a transfer switch configured to provide power at the output 113 directly from AC line power or, when line power is lost, from the power source 102. According to an alternate embodiment, the UPS 100 is an on-line UPS whereby a regulated AC output can be supplied from an AC input or a DC input without interruption. As will be recognized by those of ordinary skill in the art, the invention may be employed with any type of UPS including those listed here and other types of UPSs.

FIG. 1 illustrates an embodiment of a connection of a device 100 to a power source 102. As is discussed in greater detail below, according to one embodiment, one or more of a signal circuit, a current limiting circuit and a power circuit may be connected when the power source 102 and the device 100 are connected using connection 115.

According to one embodiment, the device 100 and power source 102 are employed in a system having redundant power sources that may be swapped while the device 100 is operating. In other embodiments, the device 100 is a laptop computer, a camcorder, a cell phone, or some other portable electronic device. In a version of each of these embodiments, the power source 102 may be a battery power source.

In one embodiment, the device 100 is an uninterruptible power supply that is connected to one or more DC power sources, and may also be connected to one or more AC power sources. Further, in a version of this embodiment, the power source 102 is a DC power source, for example, a battery pack. The power source 102 can be an internal battery cartridge that is included in the device 100 when it is connected to the device 100. Alternatively, the power source 102 can be an external battery pack that may also be connected to the device either alone or in combination with an internal battery.

Figure 2:
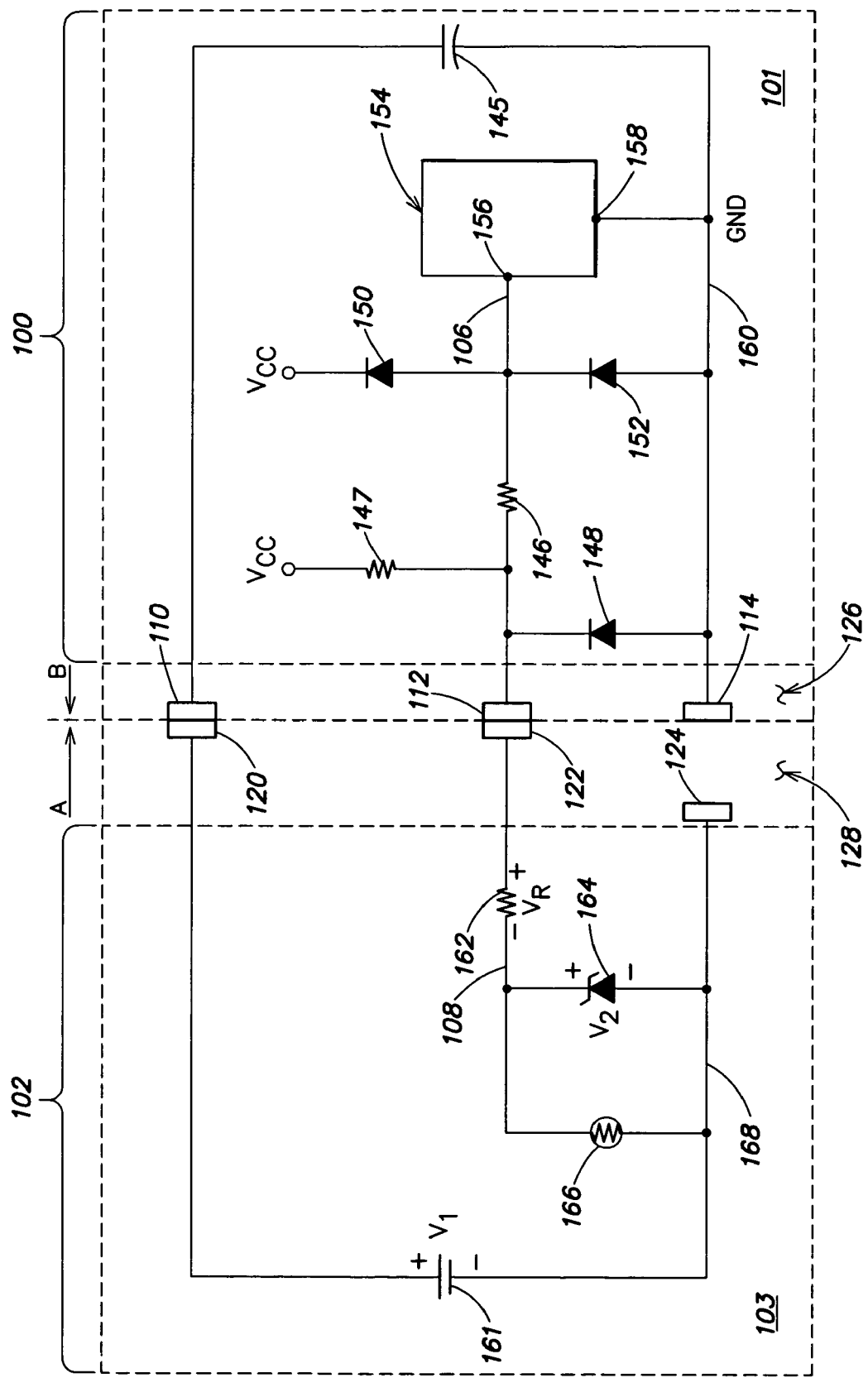
FIG. 2 is a schematic of circuitry in accordance with an embodiment of the present invention.

FIG. 2 is a schematic diagram of a connection between device circuitry 101 and power source circuitry 103 in accordance with an embodiment of the invention. In one embodiment, the device 100 includes contacts 110, 112, 114, and the power source 102 includes contacts 120, 122, 124. According to one embodiment, the contacts included in the device 100 may be an integral component of a unit that houses both the device 100 and the contacts 110, 112, 114 in the same housing.

Alternatively, the contacts 110, 112, 114 may be located at an end of an electrical cord or other cabling where the end of the cord opposite the end where the contacts are located has a fixed connection to the device 100. The contacts 120, 122, 124 employed in the power source 102 can also be housed in the same housing as the power source 102 or alternatively, they can be located remotely, for example at the end of an electrical cord.

According to one embodiment, the contacts 110, 112, 114 are included in a first connector 126 and the contacts 120, 122, 124 are included in a second connector 128. In one embodiment, a connection of the device 100 and the power source 102 is made by engaging contacts 110, 112, 114 associated with the device 100 with the corresponding contacts associated with the power source 102 (i.e., contacts 120, 122, 124, respectively). For example, according to one embodiment, the connection can be made by moving either or both sets of contacts in the direction of arrows A and B, as is well known by those of skill in the art. In one embodiment, the first connector 126 and the second connector 128 are included as a part of the device 100 and the power source 102, respectively. According to one embodiment, a single connector (e.g., one of connectors 126, 128) is used. In this embodiment, the connector (which includes a set of contacts) is affixed to a corresponding set of stationary contacts located in one of the device 100 or the power source 102.

In accordance with one embodiment, the device 100 includes circuitry 101 that includes a capacitor 145 connected to the contact 110 and the contact 114. In one embodiment, the contact 114 is also connected to ground. The circuitry 101 of the device 100 also includes a first resistor 146, a second resistor 147, a first diode 148, a second diode 150, and a third diode 152. In one embodiment, the circuitry 101 also includes a controller 154, for example, a microcontroller or a microprocessor. In another embodiment, the controller 154 is circuitry (e.g., logic circuitry) that does not include a microcontroller, for example, the microcontroller offered by ST Microelectronics under part no. ST72F321. In one embodiment, the controller 154 includes a controller I/O 156 and a common connection 158. In one embodiment, the contacts 110, 112, 114 are included in the circuitry 101. The device 100 may also include a power supply with an output $V_{cc}$ connected to the circuitry 101. In one embodiment, the device 100 includes a power supply with a regulated output $V_{cc}$.

In embodiments where the device is a UPS, the capacitor 145, may be a filter capacitor employed to remove ripple signals that may appear in the power supplied by the power source 102. In versions of this embodiment, the capacitor 145 can also be used to remove high frequency current that might otherwise appear in the power circuit as a result of electromagnetic interference. In another embodiment, where the device 100 is a UPS and the power source 102 is a battery, the DC voltage that is supplied to the capacitor 145 is inverted to AC voltage by the UPS and is supplied to AC load connected to an output of the UPS.

According to one embodiment, the circuitry 101 is configured as follows: the first resistor 146 is connected in series between the contact 112 and the controller I/O 156. The second resistor 147 is connected in series between the power supply output $V_{cc}$ and the contact 112. A cathode of the first diode 148 is also connected to the contact 112 while the anode of the first diode 148 is connected to the contact 114 which may also be included as part of a common line 160, for example, ground. The cathode of the second diode 150 is connected to the power supply output $V_{cc}$ and the anode of the second diode 150 is connected to the controller I/O 156. The cathode of the third diode 152 is also connected to the controller I/O 156 while the anode of the third diode 152 is connected to the common line 160.

In accordance with one embodiment, the circuitry 101 includes a signal line 106 that connects the controller I/O 156 to circuitry in the power source 102. In one version, the controller I/O 156 is connected to circuitry in the power source 102 via the first resistor 146 and the contact 112.

According to one embodiment, the power source includes circuitry 103 with a power source 161 connected to the contact 120 and the contact 124. Thus, in one embodiment, the power source 161 can be an integral component of the power source 102 where the power source 102 is portable. In one embodiment, the power source 161 is a battery where a positive battery terminal is connected to the contact 120 and a negative battery terminal is connected to the contact 124. The power source circuitry 103 also includes a resistor 162, a voltage clamping device 164, and a sensing device 166. In an alternate embodiment, the resistor 162 is located in the circuitry 101 instead of the circuitry 103 where, in one version, it is connected between the anode of the first diode 148 and the contact 112.

In one embodiment, the circuitry 103 includes a signal line 108 that connects the sensing device 166 or other circuitry to the device 100. In one version, the sensing device 166 or other circuitry is connected to the circuitry 101 via the resistor 162 and the contact 122.

In one embodiment, the voltage clamping device 164 provides a substantially fixed voltage when it is biased in a given manner. For example, in one version, the voltage clamping device 164 provides a substantially fixed voltage when it is reverse biased. In one or more embodiments, the voltage clamping device 164 may be a transient voltage suppressor, a transient voltage absorber, a zener diode, or an avalanche diode. Depending upon the embodiment, the substantially fixed voltage may be referred to as a breakdown voltage, a clamping voltage, or an avalanche voltage. According to one embodiment, the voltage clamping device is a 1.5KE10A unidirectional transient voltage suppressor. The voltage clamping device 164 may also be, for example, a thyristor, a metal oxide varistor ("MOV"), a silicon controlled rectifier ("SCR") or other device that maintains a substantially fixed voltage when it is conducting. In another embodiment, the voltage clamping device 164 is a gas tube device. Thus, according to some embodiments, the voltage clamping device is a semiconductor device and according to some alternate embodiments the voltage clamping device may be a device that is not a semiconductor device.

The sensing device 166 can be a device that senses one or more parameters (e.g., operating parameters) of the power source 102. In one embodiment, the sensing device 166 is a thermistor used to sense the temperature of the power source 102. According to one embodiment, information provided by the sensing device 166 can be communicated to the device 100 and the controller 154 over the signal lines 106, 108.

In one embodiment, the power source circuitry 103 is connected as follows: a first terminal of the resistor 162 is connected to the contact 122; and a second terminal of the resistor 162 is connected to a first terminal of the voltage clamping device 164 and a first terminal of the sensing device 166 (e.g., in the signal line 108). In one embodiment, the first terminal of the voltage clamping device 164 is a cathode of the voltage clamping device and a second terminal of the voltage clamping device is an anode of the voltage clamping device 164. In a version of this embodiment, the anode of the voltage clamping device 164 is connected to a common line 168 included in the power source 102. The common line 168 is connected to the contact 124. A second terminal of the sensing device 166 is also connected to the common line 168.

Each of the connections between the device 100 and the power source 102 is completed when a contact associated with the device 100 engages a corresponding contact associated with the power source 102. In one embodiment, when the device 100 and the power source 102 are fully connected, the contact 110 makes contact with the contact 120, the contact 112 makes contact with the contact 122, and the contact 114 makes contact with the contact 124.

As mentioned above, often, there are a plurality of circuits whose connections are completed when the contacts (e.g., the contacts 110, 112, 114) associated with the device 100 are engaged with the contacts (e.g., the contacts 120, 122, 124) associated with the power source 102. A current limiting circuit is one such circuit. Current limiting circuits are often used when connecting a device to a power source to limit the current drawn by the device when it is first connected to the power source. For example, the device may include a large capacitance that is precharged when the current limiting current is connected. Generally, the current limiting circuit includes a first part in the circuitry 101 of the device 100 and a second part in the circuitry 103 of the power source 102. The current limiting circuit is completed when the contacts associated with the device 100 engage the contacts associated with the power source 102; thereby, connecting the first part of the current limiting circuit to the second part of the current limiting circuit.

In addition, a power circuit provides a path for the transfer of power from the power source 102 to the device 100. That is, the power circuit delivers power from the power source 102 for consumption by the device 100 (or, in the case of a UPS, for power transmitted from the device 100 to other electrical equipment connected to the device 100). Generally, the power circuit includes a first part in the circuitry 101 of the device 100 and a second part in the circuitry of the power source 102. The power circuit is completed when the contacts associated with the device 100 engage the contacts associated with the power source 102; thereby, connecting the first part of the power circuit to the second part of the power circuit.

As mentioned above, where a signal circuit is provided it may, for example, allow information to be communicated between the power source 102 and the device 100 that is connected to. Common examples include the communication of signals corresponding to the charge-status, the temperature and other operating parameters of the power source. In various alternate embodiments, the sensing device 166 includes two or more circuit elements and/or a processor that provide information to the device 100. In one embodiment, the signal circuit provides for bi-directional communication between the device 100 and the power source 102, and the sensing device 166 receives information from the device 100. In a version of this embodiment the sensing device 166 responds to the information that it receives by, for example, adjusting the operation of the power source 102.

Generally, the device 100 connected to the power source 102 can employ the information provided by the signal circuit to control operation of the power source and/or the device. The signal circuit also includes a first part in the circuitry 101 of the device 100 and a second part in the circuitry of the power source 102. The signal circuit is completed when the contacts associated with the device 100 engage the contacts associated with the power source 102; thereby, connecting the first part of the signal circuit to the second part of the signal circuit.

According to one embodiment, connections for one or more of the current limiting circuit, the power circuit and the signal circuit are completed in two or more different stages. In one embodiment, one or more of the contacts 110, 112, 114 of the device 100 and the contacts 120, 122, 124 of the power source 102 are configured to provide a sequenced or multi-stage connection between the device 100 and the power source 102. That is, two or more pairs of contacts (e.g., the contact pair 110/120 and the contact pair 112/122) engage and complete at least one circuit before one or more additional contact pairs engage and complete one or more additional circuits.

According to one embodiment, a multi-stage connection between the device 100 and the power source 102 results from a mechanical offset of one or more contacts. For example, in one embodiment, the contacts include pins and a length of at least one of the pins is shorter than some of the other pins such that there is a delay in the engagement of at least one contact pair relative to the other contact pairs used to connect the circuitry 101 of the device 100 to the circuitry 103 of the power source 102.

According to another embodiment, a mechanical interlock is used to delay the engagement of one or more contact pairs. In an alternative embodiment, the engagement of the contact pairs is not delayed, but the completion of one or more current paths included in at least one of the precharge circuit, the power circuit, and the signal circuit is delayed by an electrical interlock. In a version of this embodiment, the completion of the signal circuit is delayed by an electrical interlock.

In one embodiment, a first stage of connection occurs when the device 100 and the power source 120 are partially connected. As shown in the embodiment of FIG. 2, the partial connection results in the contact 110 and the contact 120 making contact with one another, and the contact 112 and the contact 122 making contact with one another. However, the contact 114 and the contact 124 are not in contact with one another in the first stage.

In the embodiment shown in FIG. 2, a second stage of connection occurs when the device 100 and the power source 120 are further connected. In a version of this embodiment, the second stage occurs when the device 100 and the power source 102 are fully connected. The second stage is a stage of connection that occurs after the first stage of connection, however, in one embodiment, the second stage does not result in the device 100 and the power source 120 being fully connected. Instead, in this embodiment, there is a third or subsequent stage of connection that follows the second stage, for example, where a connector (e.g., the connectors 126, 128) is mechanically secured to the device 100 or the power source 102.

In one embodiment, a current limiting circuit is completed when the device 100 and the power source 102 are at a first stage of connection. In this embodiment, the current limiting circuit is employed to partially charge the capacitor 145 (e.g., precharge the capacitor) in a controlled manner before the full voltage provided by the power source 102 is applied across the capacitor 145. A first part of the current limiting circuit is located in the device 100. The first part of the current limiting circuit includes the capacitor 145 and the first diode 148 where a first terminal of the capacitor 145 is connected to the contact 110 and a second terminal of the capacitor 145 is connected to the common line 160. The first diode 148 connects the common line 160 to the contact 112.

The power source 102 includes a second part of the current limiting circuit. In the embodiment shown in FIG. 2, the second part of the current limiting circuit includes the resistor 162, the voltage clamping device 164 and the power source 161. A first terminal of the resistor 162 is connected to the contact 122 and a second terminal of the resistor 162 is connected to a first terminal of the voltage clamping device 164. A second terminal of the voltage clamping device 164 is connected to the common line 168. The power source 161 is connected to the contact 120 and to the common line 168.

In operation, power is delivered to the capacitor 145 as current flows from power source 161 to contact pair 120/110 and to the first terminal of the capacitor 145. The current flows from the first terminal of the capacitor 145 to the second terminal of the capacitor 145 and to the common line 160. The first diode 148 becomes forward biased because the potential on the common line 160 (which is connected to the anode of the first diode 148) is greater than the potential on the cathode of the first diode 148. The current supplied by the power source 161 then returns to the power source circuit 103 via the contact pair 112/122 and flows through the resistor 162. In one embodiment, the voltage clamping device 164 becomes reverse biased as a result of the potential across it. When reversed biased, the voltage clamping device 164 conducts current with a substantially constant voltage across the voltage clamping device 164. The current then returns to the power source 161 via the common line 168.

In one embodiment, the above-described current limiting circuit limits the voltage across the capacitor 145 to a voltage less than the full voltage of the power source 161. According to one embodiment, the maximum voltage applied across the capacitor 145 when it is in the current limiting circuit is substantially equal to the voltage of the power source 161 less the voltage drop across the voltage clamping device 164.

In another embodiment, the voltage drop across the voltage clamping device has a very small value, which in one version, is very close to zero volts. In one version of this embodiment, the voltage clamping device 164 is replaced by an SCR crowbar circuit and the capacitor 145 is charged to a maximum voltage that is substantially equal to the voltage of the power source 161.

In one embodiment, the current limiting circuit is the only circuit (among the current limiting circuit, the power circuit, and the signal circuit) that is complete when the device 100 and the power source 102 are at the first stage of the connection. According to one embodiment, a power circuit and a signal circuit are complete when the device 100 and the power source 102 are at a second stage of the connection. In a version of this embodiment, the current limiting circuit is inoperative when the device 100 and the power source 102 are at the second stage of the connection.

In one embodiment, a first part of the power circuit is located in the device 100, and in a version of this embodiment, the first part of the power circuit includes circuitry connected from the contact 110 to the contact 114. The power circuit can include, for example, the capacitor 145. A second part of the power circuit is located in the power source 102. In a version of this embodiment, the second part of the power circuit includes circuitry connected from the contact 120 to the contact 124. The power circuit can include, for example, a battery source of power (e.g., power source 161) where a positive battery potential is connected to the contact 120 and a negative battery potential is connected to the contact 124.

In one embodiment, the power circuit supplies the full voltage available from the power source 161 to the capacitor 145 when the device 100 and the power source 102 are at the second stage of connection to fully charge the capacitor 145. In a version of this embodiment, the device 100 and the power source 102 are fully connected at the second stage of connection. For example, no additional contact pairs (e.g., the contact pair 114/124) remain disconnected.

In the embodiment shown in FIG. 2, the second stage of connection does not occur until the contact 114 makes contact with the contact 124. When the power circuit is complete, power can flow from the power source 161 to the capacitor 145 via the contact pair including the contacts 110, 120, and the contact pair including the contacts 114, 124. As is seen in FIG. 2, in one embodiment, the current path for the power circuit does not include any current limiting circuit elements because the contact pair including the contacts 114, 124 provides a low resistance path that bypasses some of the circuit elements that were included in the precharge circuit. Specifically, the power being supplied to the capacitor 145 no longer flows through the first diode 148, the resistor 162 and the voltage clamping device 164. Thus, in one embodiment, the current limiting circuit is inoperative at the second stage of connection. In a version of this embodiment, neither the diode 148 nor the voltage clamping device 164 are conducting when the power source 102 and the device 100 are in the second stage of connection, i.e., the diode 148 and the voltage clamping device 164 are turned off.

As mentioned above, according to one embodiment, one or more signal circuits are also completed when the device 100 and the power source 102 are at the second stage of connection. In a version of this embodiment, the connection provided by the contact 112 and the contact 122 is available at the second stage of connection for use in the signal circuit as the current limiting circuit is not used at this stage of connection. In the embodiment shown in FIG. 2, the signal circuit is completed when a first part of the signal circuit included in the device 100 is connected to a second part of the signal circuit included in the power source 102 via the contact pair including the contacts 112, 122 and the contact pair including the contacts 114, 124.

According to one embodiment, the first part of the signal circuit includes the first resistor 146, the second resistor 147, the first diode 150, the second diode 152 and the controller 154. The connection of the controller 154 to the contacts 112 and 114 is via the common line 160 that connects common connection 158 of the controller 154 to the contact 114, and a signal line that connects the controller I/O 156 to the contact 112 via the resistor 146 (e.g., via the signal line 106). The signal circuit can also include regulated power supply outputs such as the power supply output $V_{cc}$ shown in FIG. 2. In one embodiment, the second part of the signal circuit includes the resistor 162 and the sensing device 166 located in the power source 102. Thus, in one or more embodiments, contacts 112, 122 are employed in a circuit that charges the capacitor 145 at the first stage of connection, but then in the second stage of connection, the contacts 112, 122 are not included in a circuit with the capacitor 145.

As mentioned above, some of the circuit elements employed in the current limiting circuit become inactive when the device 100 and the power source are at the second stage of connection. Thus, information and other signals may be communicated between the device 100 and the power source 102 over the signal lines 106, 108. For example, a voltage signal indicative of the temperature of the power source 102 can be transmitted from the sensing device 166 to the controller 154 over the signal lines 106, 108. Further, instructions may be communicated from the device 100 to the power source 102 over the signal lines 106, 108.

The embodiments described herein result in the controlled charging of the capacitor 145 in at least two stages. In the first stage, the current limiting circuit controls the charging of the capacitor to a first potential that is a value less than the potential of the power source 161 (e.g., less than the voltage supplied by the power source 161). In one embodiment, the voltage $V_1$ is a battery voltage. According to one embodiment, at the first stage of connection, the capacitor 145 is charged to a maximum of the potential of the power source 161 (i.e., the voltage $V_1$) less the potential across the voltage clamping device 164 (i.e., the voltage $V_2$). In a version of this embodiment, the voltage $V_2$ is a clamping voltage that results when the voltage clamping device 164 is reverse biased. In one embodiment, the magnitude of the inrush current that occurs during the first stage of connection is small enough that either arcing does not occur or an insubstantial amount of arcing occurs across the contacts that connect the device 100 to the power source 102. For example, the arcing may not result in damage to the contacts (e.g., the contacts 110, 120) and/or the arcing may not be visible to a user who connects the device 100 and the power source 102.

In one embodiment, the difference between the potential of the power source 161 and the first potential is small enough that the capacitor 145 becomes fully charged in the second stage of connection without the need for any further current limiting. That is, any arcing that does occur when the connection of device 100 and power source 102 reaches the second stage of connection is insubstantial. In one embodiment, no arcing occurs.

Various embodiments may provide different values for the inrush current at the first stage of connection and the inrush current at the second stage of connection Design parameters that may effect the inrush current values and may inform design choices include: the capacitance of the capacitor 145; the available time delay between the completion of the current limiting circuit and the completion of the power circuit; the voltage of the power source 161; the voltage of any power supplies employed with signal circuitry; the peak current rating of any connectors used to connect the device 100 to the power source 102, e.g., the connectors 126, 128; the voltage drop provided by the voltage clamping device 164; and the power ratings of the devices employed in the current limiting circuit. Any of these may be considered alone or in combination with these or other parameters. For example, other considerations include the equivalent series resistance of each of the capacitor 145 and the power source 161 as well as the series resistance and inductance of the interconnect wires and contacts. Further, because many of these design parameters are closely related, often a plurality of the parameters and their effects on one another are considered together.

The maximum inrush current in both stages of connection may, for example, be a current that is less than the peak current rating of any connector used to connect the device 100 to the power source 102.

In one embodiment, the maximum inrush current of the first stage of connection occurs at the point of the first stage of connection when the device 100 and the power source 102 are initially connected because, for example, the capacitor 145 is fully discharged. The first diode 148 becomes forward biased and begins conducting the charging current for the capacitor 145. The voltage clamping device 164 also begins to operate and conducts the charging current with a fixed voltage (e.g., a clamping voltage) across the device 164. Assuming that the maximum inrush current for the first stage of connection occurs when the device 100 and the power source 102 are initially connected, the voltage drop $V_R$ across the resistor 162 is also at its maximum for the first stage of connection when the device 100 and the power source 102 are initially connected.

According to one embodiment, the maximum inrush current (e.g., the charging current for the capacitor 145) is primarily limited by the resistance of the resistor 162 for the first stage of connection. Generally, the turn-on voltage across the first diode 148 is very small in comparison to the voltage $V_2$ across the voltage clamping device 164. In a version of this embodiment, the maximum inrush current is determined by Equation 1:

$$\frac{V_1 - V_2}{R_{162}} \quad \text{Eq. (1)}$$

The capacitor 145 charges at a rate determined by the RC time constant of the combination of the capacitor 145 and the resistor 162. As a result, the current begins to decrease as the capacitor 145 is charged and the voltage across the resistor 162 begins to decrease with the decrease in current flow in the current limiting circuit.

As is shown by Equation 1, the maximum inrush current of the first stage of connection can be controlled by selecting the various components used in the current limiting circuit. For example, in one embodiment, where the voltage $V_1$ is fixed as a result of the selection of the power source 102 and the capacitance 145 is established by the choice of device 100, the selection of the resistor 162 and/or the voltage clamping device 164 can, in part, determine the maximum inrush current of the first stage of connection. Specifically, the greater the resistance of the resistor 162 that is selected for an application the smaller the maximum inrush current for the first stage of connection. Also, the greater the voltage $V_2$ provided by the selected voltage clamping device 164 the smaller the maximum inrush current for the first stage of connection.

Although one or more embodiments provide for the selection of the voltage clamping device 164 based on a desired maximum inrush current, the selection may also be based upon additional operational considerations. For example, in one embodiment, the voltage $V_2$ provided by the selected voltage clamping device 164 should be less than the voltage $V_1$ provided by the power source 161 and greater than the nominal voltage of any power supplies connected to the signal circuitry (e.g., the voltage $V_{cc}$).

For example, the voltage $V_2$ provided by the selected voltage clamping device 164 should be less than the voltage $V_1$ to provide for a suitable level of charging current to charge the capacitor 145. That is, the current limiting circuit will not conduct the charging current of the capacitor 145 if the voltage supplied by the power source 161 is insufficient to bias (e.g., reverse bias) the voltage clamping device 164.

The voltage $V_2$ provided by the selected voltage clamping device 164 should be greater than the nominal output voltage of any power supplies connected to the signal circuitry (e.g., the power supply output $V_{cc}$) to prevent the voltage clamping device 164 from operating when the device 100 and the power source 102 are in the second stage of connection. That is, as described above, the current limiting circuit is not operational at the second stage of connection. Further, in one embodiment, the sensing device 166 is connected in parallel with the voltage clamping device 164 from the signal line 108 to the common line 168. The voltage clamping device 164 should be selected to prevent it from turning on as a result of any voltage present in the signal circuit because its operation may interfere with the operation of the signal circuit.

According to one embodiment, the device 100 and the power source 102 are connected beginning with the first stage of connection when, for example, two or more contact pairs (e.g., contacts 110/120) first engage and a first circuit is completed. One or more additional contact pairs 114/124 may then engage in a subsequent stage of connection. Generally, as described above, a time delay exists between the first stage of connection and any subsequent stage of connection. The time delay may be the result of a mechanical offset, or a mechanical or electrical interlock. In one embodiment, for example, where the time delay is a result of a mechanical offset, a first contact pair including the contacts 110, 120 and a second contact pair including the contacts 112, 122 engage and complete a first circuit at a time $t_0$ when a connector is in a first position. The connection may be the result of a user plugging a first connector into a second connector, for example, plugging a connector located at an end of a cord into a connector located at the device 100 or the power source 102. Then, at some subsequent time $t_1$, when the connector is further engaged, at least one additional contact pair (e.g., the contacts 114, 124) engage. In this example, the time delay (e.g., the time delay $t_1 - t_0$) between the completion of the first stage of connection and the completion of the second stage of connection is determined by the amount of time it takes the user to move the connector from the first stage of connection to the second stage of connection. That is, the time it takes the user to overcome the mechanical offset provided in the design of the contacts and/or connector.

Although the amount of time required to move from the first stage of connection to the second stage of connection may vary slightly from one user to the next, an average time delay can be employed when designing the current limiting circuit. In one embodiment, the average minimum time delay among a plurality of users is estimated and then employed when designing the current limiting circuit. Further, the most substantial amount of the time delay may result primarily from the mechanical offset in the above example. That is, in one embodiment, variance in the connection-time from user to user is inconsequential relative to the total amount of the time delay $t_1 - t_0$. In another embodiment, where the variance in connection-time from user-to-user is significant, the mechanical offset may provide a minimum delay that is sufficient to prevent the variance from negatively affecting the transition from the first stage of connection to the second stage of connection regardless of the user's connection-time.

According to one embodiment, the time delay is adjusted to allow enough time for the capacitor 145 to charge to a minimum potential before the second stage of connection is reached. That is, a minimum value for the first potential is established. In a version of this embodiment, the mechanical offset of one or more contacts (e.g., the contact 124) is adjusted such that the minimum value is achieved before the second stage of connection is reached.

In practice, physical size limitations can limit the amount of mechanical offset that is provided in such an embodiment. For example, connector size may be limited by space considerations within the device 100, the power source 102, and associated electrical cords (if any) that may connect the two. Thus, where a mechanical offset is employed to create the time delay, other design parameters may be considered in view of the available time delay when selecting components that may effect the inrush current values.

The peak power of each device in the circuitry is another operational consideration that can be addressed in embodiments of the invention. For example, the maximum inrush current can be established to maintain the power dissipated by the circuit components at a value that is less than or equal to the peak power rating of each device (e.g., a value less than the peak power rating of the lowest rated device). The peak power of each device is a function of the voltage drop across the device and the current flowing in the device. For example, at the first stage of connection, inrush current will flow through each of the first diode 148, the resistor 162 and the voltage clamping device 164.

The power dissipated by the voltage clamping device 164 is the product of the current multiplied by the voltage drop across the voltage clamping device 164. Where the voltage across the voltage clamping device 164 is substantially fixed, for example, by its clamping voltage, the maximum power that is dissipated by the voltage clamping device 164 is a product of the clamping voltage and the maximum inrush current that occurs during the first stage of connection. Thus, in one embodiment, the peak power rating of a selected voltage clamping device 164 should be selected in view of the maximum inrush current that occurs during the first stage of connection. Because the voltage drop across the first diode 148 is also fixed (in the range of between approximately 0.4 to 1.2 volts depending upon the characteristics of the selected diode) when it is conducting, in one embodiment, the peak power rating of a selected first diode 148 should also be determined in view of the maximum inrush current that occurs during the first stage of connection.

Although the resistor 162 is employed in both the current limiting circuit and the signal circuit, generally, the peak power dissipated by the resistor 162 also results from the maximum inrush current that occurs during the first stage of connection. Thus, in one embodiment, the peak power rating of the selected resistor 162 should also be selected in view of the maximum inrush current that occurs during the first stage of connection.

The selection of circuit components is not made solely based on the maximum inrush current. For example, component selection also depends upon other circuit parameters and other system parameters as is described herein. In addition, a maximum inrush current that occurs during the second stage of connection may be greater than the maximum inrush current that occurs during the first stage of connection. As a result, in one embodiment, the value of the maximum inrush current that occurs during the second stage of connection is considered when selecting some circuit components, for example, the circuit components included in the power circuit and/or the signal circuit.

The selection of circuit components in one example system is described here. In this example, system parameters that are known include: a time delay (e.g., the time delay $t_1-t_0$) of 0.1 seconds; a capacitance of 5000 uF for the capacitor 145; a peak current rating of 100 amperes for one or more connectors (e.g., the connectors 126, 128); a nominal voltage of 48 volts for the power source 161; and a nominal output voltage (e.g., the voltage $V_{cc}$) of 5 volts for the power supply connected to the signal circuitry.

A voltage clamping device 164 with a voltage rating of 10 volts is selected, in part, because it operates with a voltage that is greater than the 5 volt power supply output voltage and less than the 48 volt power source 161. The resistor 162 is selected to limit the inrush current during the first stage of connection to a maximum of 100 amperes which equals the peak current rating of the connector(s). Because the maximum voltage drop across the resistor is the voltage of the power source 161 less the voltage of the voltage clamping device 164, the resistance is selected using the following equation:

$$\frac{V_1 - V_2}{I_{MAX}} \quad \text{Eq. (2)}$$

or $$\frac{48 - 10}{100} \quad \text{Eq. (3)}$$

which results in a 0.38 ohm minimum allowable resistance for the resistor 162. Accordingly, in this example, a one ohm resistor is selected for the resistor 162. Referring again to Equation 1, in this example, a 1 ohm resistor limits the maximum inrush current occurring at the first stage of connection to 38 amperes.

Because the inrush current that occurs at the second stage of connection will, at least in part, depend upon the amount of the charge that was previously built up on the capacitor 145 during the first stage of connection, the amount of charging that occurs during the first stage of connection should be determined in view of the RC time constant created by the combination of the 1 ohm resistance of resistor 162 and the 5000 uF capacitance of the capacitor 145. Here, the RC time constant is 5 mS. Accordingly, the capacitor 145 is charged to approximately 63% of the voltage across the RC circuit elements within 5 mS. Because 63% of 38 volts (i.e., $V_1-V_2$) is 24 volts, it is apparent that the time delay of 100 mS provides a sufficient amount of time for the capacitor to charge to approximately 38 volts.

The capacitor 145 then becomes fully charged to 48 volts when the second stage of connection is reached. As shown in FIG. 2, in one embodiment, the capacitor 145 is connected across the terminals of the power source 161; therefore, current limiting circuit elements are not employed when the capacitor is charged in the second stage of connection. As a result, in one embodiment, the maximum inrush current that occurs during the second stage of connection is determined by the equivalent series resistance of the capacitor 145 and the power source 161. In a version of this embodiment, the power source 161 is a battery and the equivalent series resistance is 0.1 ohms. As a result, in one embodiment, the maximum inrush current that occurs in the second stage of connection is approximately 100 amperes which is determined by dividing the 10 volt difference between the nominal voltage of the power source 161 and the precharge voltage of the capacitor 145 that occurs during the first stage of connection by the equivalent series resistance of the capacitor 145 and the power source 161.

As described herein, two or more stages of connection are used to connect a device 100 to the power source 102, however, continuous operation of the device 100 while in the first stage of connection may not be desirable. Thus, steps can be taken to protect against a device-power source connection that remains at the first stage of connection for an extended period. Such a condition may, for example, result from a partially inserted connector that is used to connect the device 100 and the power source 102. The duration of the allowable continuous connection between the device 100 and the power source 102 may vary depending upon the application.

At least two problems may result from extended operation at the first stage of connection. As described above, in one embodiment, during the first stage of connection the maximum voltage across the device 100 is the voltage of the power source 161 (e.g., the voltage $V_1$) less the voltage of the voltage clamping device 164 (e.g., the voltage $V_2$). In other words, the device 100 is receiving less voltage from the power source 102 than required for continuous operation. In addition, if the first stage of connection is maintained for an extended period, the first diode 148, the resistor 162, and the voltage clamping device 164 will see a continuous current flow that they may or may not be designed for. Embodiments of the invention can be designed to operate in this state, however, other embodiments may not be so designed.

A number of methods may be employed alone or in combination to protect the device circuitry 101 and the power source circuitry 103 from damage that would otherwise result from an extend period of continuous operation at the first stage of connection. In one embodiment, the device 100 may include a system to detect the reduced voltage and turn the device off in response. In another embodiment, the device 100 includes a system to detect the current flowing through the first diode 148 when it is forward biased and opens the circuit and/or turns the device 100 off if the forward bias continues for a predetermined amount of time. In yet another embodiment, the device 100 may include a system that detects that the contact 114 is not connected to the power supply 102 and turns the device 100 off. In general, various types of electrical and mechanical interlocks can be employed to prevent an extended period of operation at the first stage of connection. Each of the preceding approaches may also provide a warning to the user instead of turning the device off, or alternatively, the preceding approaches may provide the warning in advance of turning the device 100 off. Each of the above approaches may also include the protective system(s) in the device circuitry 101. For example, any of the preceding embodiments may employ the controller 154 in the protection scheme.

As is shown in FIG. 2, the voltage $V_2$ provide by the voltage clamping device 164 is present on the signal circuit (e.g., on the signal line 108) during the first stage of connection when the capacitor 145 is being precharged. Also, as explained above, the voltage $V_2$ is greater than the nominal output voltage $V_{cc}$ of the power supplies that are employed in the signal circuitry. That is, the voltage $V_2$ is greater than the normal operating voltage appearing on the signal circuit. Therefore, another design consideration is the protection of the signal circuit, and the components employed in it, from the relatively higher voltage provided by the voltage clamping device 164.

Figure 3:
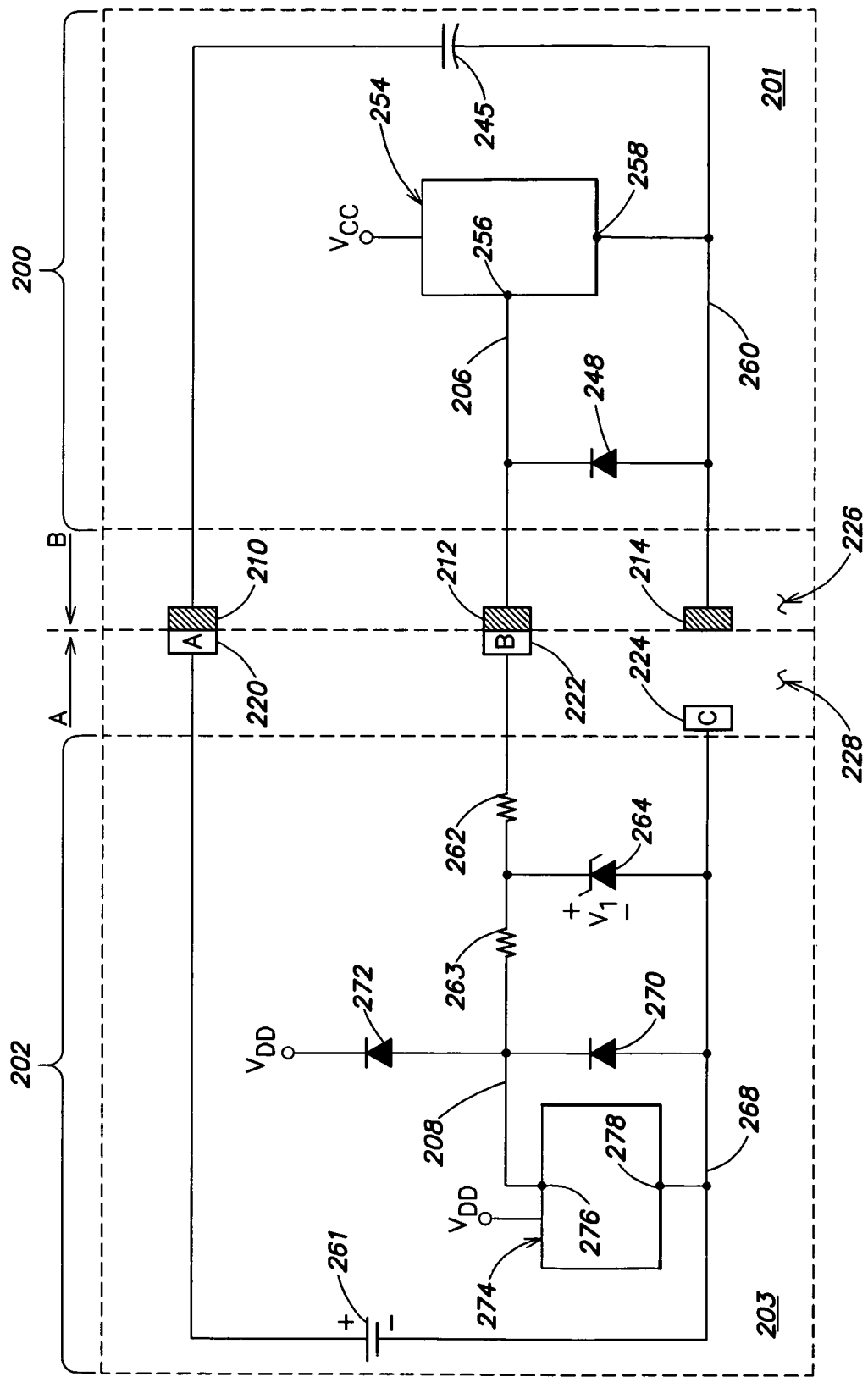
FIG. 3 is a schematic of circuitry in accordance with another embodiment of the invention.

Referring now to FIG. 3, an embodiment is shown that protects the signal circuit from the increased voltage provided by the voltage clamping device 264. FIG. 3 illustrates a device 200 and a power source 202 in a first stage of connection.

In one embodiment, the device 200 includes contacts 210, 212, 214, and the power source 202 includes contacts 220, 222, 224. According to one embodiment, the contacts included in the device 200 may be an integral component of a unit that houses both the device 200 and the contacts 210, 212, 214 in the same housing. Alternatively, the contacts 210, 212, 214 may be located at an end of an electrical cord or other cabling where the end of the cord opposite the contacts has a fixed connection to the device 200. The contacts 220, 222, 224 employed in the power source 202 can also be housed in the same housing as the power source 202 or alternatively, they can be located remotely, for example at the end of an electrical cord.

According to one embodiment, the contacts 210, 212, 214 are included in a first connector 226 and the contacts 220, 222, 224 are included in a second connector 228. In one embodiment, a connection of the device 200 and the power source 202 is made by engaging contacts 210, 212, 214 associated with the device 200 with the corresponding contacts associated with the power source 202 (i.e., contacts 220, 222, 224, respectively). For example, the connection can be made by moving either or both sets of contacts in the direction of arrows A and B, as is well known by those of skill in the art. In one embodiment, the first connector 226 and the second connector 228 are included as a part of the device 200 and the power source 202, respectively.

In accordance with one embodiment, the device 200 includes circuitry 201 that includes a capacitor 245 connected to the contact 210 and the contact 214. In one embodiment, the contact 214 is also connected to ground. The circuitry 201 of the device 200 also includes a diode 248. In one embodiment, the circuitry 201 also includes a controller 254, for example, a microcontroller or a microprocessor. In another embodiment, the controller 254 is circuitry (e.g., logic circuitry) that may not include a microcontroller. In one embodiment, the controller 254 includes a controller I/O 256 and a common connection 258. The circuitry 201 may also include a power supply output $V_{cc}$, e.g., an output of a regulated power supply. In one embodiment, the contacts 210, 212, 214 are included in the circuitry 201.

According to one embodiment, the circuitry 201 is configured as follows: the controller I/O 256 is connected to the contact 212. A cathode of the diode 248 is also connected to contact 212 while the anode of the diode 248 is connected to contact 214 which may also be included as part of a common line 260, for example, ground. The power supply output $V_{cc}$ is connected to the controller 254. In one embodiment, the circuitry 201 includes power circuitry which includes the capacitor 245 connected to the contact 210 and the contact 214.

In accordance with one embodiment, the circuitry 201 includes a signal line 206 that connects the controller I/O 256 to circuitry in the power source 202. In one version, the controller I/O 256 is connected to circuitry in the power source 202 via the contact 212.

According to one embodiment, the power source 202 includes circuitry 203 with a power source 261 connected to the contact 220 and the contact 224. In one embodiment, the power source 261 is battery where a positive battery potential is connected to the contact 220 and a negative battery potential is connected to the contact 224. The power source circuitry 203 also includes a first resistor 262, a second resistor 263, a voltage clamping device 264, a first diode 270, and a second diode 272. The circuitry 203 also includes signal block 274 and a power supply output $V_{DD}$, e.g., an output of a regulated power supply. In one embodiment, the signal block 274 includes a signal block I/O 276 and a common connection 278 that is connected to a common line 268.

In one embodiment, the circuitry 203 includes a signal line 208 that connects the signal block 274 to the device 200. In one version, the signal block 274 is connected to the circuitry 201 via the contact 222, the first resistor 262, and the second resistor 263.

In one embodiment, the voltage clamping device 264 provides a substantially fixed voltage when it is biased in a given manner. For example, in one version, the voltage clamping device 264 provides a substantially fixed voltage when it is reversed biased. In one or more embodiments, the voltage clamping device may be a transient voltage suppressor, a transient voltage absorber, a zener diode, and an avalanche diode. Depending upon the embodiment, the substantially fixed voltage may be referred to as a breakdown voltage, a clamping voltage or an avalanche voltage. According to one embodiment, the voltage clamping device 264 is a 1.5KE10A unidirectional transient voltage suppressor available, for example, from Diodes, Inc. of Westlake Village, Calif.

In one embodiment, the signal block 274 is circuitry that includes a sensing device to sense one or more parameters of the power source 202. The information generated by the signal block 274 may, in one embodiment, be communicated to the device 200. Further, in one embodiment, information may also be communicated from the device 200 to the signal block 274. Generally, the signal block 274 may be any type of circuitry employed for sensing and/or communication. In one embodiment, the signal block 274 includes a microcontroller or microprocessor. In another embodiment, the signal block 274 is a thermistor used to sense the temperature of the power source 202.

In one embodiment, the power source circuitry 203 is connected as follows: a first terminal of the resistor 262 is connected to contact 222; and a second terminal of the resistor 262 is connected to a first terminal of the voltage clamping device 264 and a first terminal of the second resistor 263. In one embodiment, the first terminal of the voltage clamping device 264 is a cathode of the voltage clamping device and a second terminal of the voltage clamping device is an anode of the voltage clamping device 264. In a version of this embodiment, the anode of the voltage clamping device 264 is connected to the common line 268 included in the power source 202. The common line 268 is connected to the contact 224.

Further, the cathode of the first diode 270 is connected to a second terminal of the second resistor 263 and the anode of the first diode 270 is connected to the common line 268. The cathode of the second diode 272 is connected to the power supply $V_{DD}$, and the anode of the second diode 272 is connected to the second terminal of the second resistor 263. The second terminal of the second resistor 263 is also connected to the signal block I/O 276.

Each of the connections between the device 200 and the power source 202 is completed when a contact associated with the device 200 engages a corresponding contact associated with the power source 202. In one embodiment, when the device 200 and the power source 202 are fully connected, the contact 210 makes contact with the contact 220, the contact 212 makes contact with the contact 222, and the contact 214 makes contact with the contact 224.

The embodiment shown in FIG. 3 protects the portion of the signal circuit in the power source 202, and in particular, protects the signal block 274 from the relatively higher voltage provided by the voltage clamping device 264 by including a resistor (e.g., the second resistor 263) between the voltage $V_1$ and the signal block 274. For example, current begins to flow in the portion of the signal circuit including the second resistor 263 when the voltage $V_1$ exceeds the combined voltage of $V_{DD}$ and the voltage across the second diode 272 when it is conducting. The presence of the second resistor 263, however, limits the voltage that appears at the signal block I/O 276 as a result of $V_1$. In one embodiment, the resistance of the second resistor 263 is small enough relative to the impedance of the signal circuit that the presence of the resistor 263 does not effect the operation of the signal circuit 274.

In another embodiment, the first diode 270 is replaced by a zener diode (for example, a zener diode with a clamping voltage of 5.1 volts) that limits the voltage on the signal block 274 to a value that will not damage the signal block 274 or any components that are included in it. Alternative embodiments, may employ one or more known approaches to overvoltage protection. The use of varistors and capacitors provide two known approaches that could be employed.

The phrases "first stage of connection" and "second stage of connection" refer to a stage of connection (i.e., the first) that occurs prior to another stage of connection (i.e., the second). That is, the terms are used to provide a reference to the timing of the occurrence of one relative to the other, so they provide a reference to the sequence of those two stages of connection. However, the first stage of connection may not be the initial stage of connection between the device 100 and the power source 102. For example, in one embodiment, one or more additional stage(s) of connection may occur before the first stage of connection described herein. Further, in one embodiment, one or more stage(s) of connection may occur after the occurrence of the first stage of connection and prior to the second stage of connection. Also, in one embodiment, one or more stage(s) of connection may occur after the occurrence of the second stage of connection.

In various embodiment, one or more components included in the precharge circuit and/or the signal circuit may be included in a connector (e.g., connector 128) employed with the power source 102. For example, one or more of resistor 162, voltage clamping device 164, and sensing device 166 can be included in the connector 128.

Embodiments of the invention may be employed in a wide variety of applications. In particular, some embodiments are employed in applications that use a portable battery power source. Examples include communication systems and portable instrument and sensing systems including systems used in process control applications. Portable consumer electronic devices provide another example where embodiments of the invention may be employed, for example, laptop computers, personal digital assistants, camcorders, and cell phones. In versions of this embodiment, the power source circuitry 103 is included in a DC power source (e.g., a battery pack) used with the device 100.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. An uninterruptible power supply, comprising:
   UPS circuitry;
   a power source adapted to couple to the UPS circuitry; and
   a first contact, a second contact, and a third contact adapted to couple the UPS circuitry to the power source,
   wherein, in a first stage of connection of the UPS circuitry and the power source, the first contact and the second contact are included in a first circuit configured to provide power from the power source to the UPS,
   wherein, in a second stage of connection of the UPS circuitry and the power source, the first contact and the third contact are included in a second circuit configured to provide power from the power source to the UPS, and
   wherein, in the second stage of connection, the second contact and the third contact are included in a signal circuit configured to communicate information between the power source and the UPS.

2. The uninterruptible power supply of claim 1, wherein the signal circuit is adapted to provide a signal representative of at least one parameter of the power source.

3. The uninterruptible power supply of claim 2, wherein the signal circuit includes a sensing device in the power source that provides information concerning a status of the power source.

4. The uninterruptible power supply of claim 3, wherein the sensing device includes a thermistor configured to sense the temperature of the power source.

5. The uninterruptible power supply of claim 2, wherein the signal circuit is adapted to communicate information from the UPS circuitry to the power source.

6. The uninterruptible power supply of claim 1, wherein the first circuit includes a current limiting circuit.

7. The uninterruptible power supply of claim 6, wherein the UPS circuitry includes a capacitor, and wherein the current limiting circuit is a precharge circuit adapted to precharge the capacitor, and wherein the second circuit includes the capacitor.

8. The uninterruptible power supply of claim 7, wherein the capacitor is included in the first circuit and the second circuit.

9. The uninterruptible power supply of claim 1, wherein the power source includes a battery.

10. The uninterruptible power supply of claim 9, wherein the battery is included in a battery pack adapted to connect to the UPS circuitry.

11. The uninterruptible power supply of claim 9, wherein the uninterruptible power supply includes a second power source, wherein the second power source includes a battery.

12. The uninterruptible power supply of claim 1, wherein the first circuit is inoperative at the second stage of connection.

13. The uninterruptible power supply of claim 1, wherein the first circuit includes a voltage clamping device configured to conduct current at the first stage of connection, and not conduct current at the second stage of connection.

14. The uninterruptible power supply of claim 13, wherein the voltage clamping device is a transient voltage suppressor.

15. The uninterruptible power supply of claim 1, wherein the power source and the uninterruptible power supply are partially connected at the first stage of connection, and wherein the power source and the uninterruptible power supply are fully connected at the second stage of connection.

16. The uninterruptible power supply of claim 1, wherein, in the first stage of connection, the third contact is disconnected from one of the UPS circuitry and the power source.

17. A method of coupling a power source to an uninterruptible power supply, the method comprising acts of:
coupling a first contact and a second contact of the power source to the uninterruptible power supply, at a first stage of connection, to form a first circuit to provide power from the power source to the UPS at the first stage of connection;
coupling the first contact, the second contact and a third contact of the power source to the uninterruptible power supply, at a second stage of connection, to form a second circuit to provide power from the power source to the UPS at the second stage of connection, and a signal circuit,
applying a voltage from the power source to the uninterruptible power supply with the second circuit, wherein the second circuit includes the first contact and the third contact; and
communicating information between the power source and the uninterruptible power supply with the signal circuit, wherein the signal circuit includes the second contact and the third contact.

18. The method of claim 17, further comprising an act of providing in the signal circuit a signal representative of at least one parameter of the power source.

19. The method of claim 17, further comprising an act of providing power to the uninterruptible power supply with the first circuit.

20. The method of claim 19, further comprising an act of limiting a current flow in the first circuit.

21. The method of claim 20, wherein the uninterruptible power supply includes a capacitor, and wherein the method further comprises an act of precharging the capacitor with the first circuit.

22. The method of claim 19, further comprising an act of including a voltage clamping device in the first circuit, wherein the voltage clamping device conducts current at the first stage of connection, and wherein the voltage clamping device does not conduct current at the second stage of connection.

23. The method of claim 17, further comprising an act of providing power to the uninterruptible power supply with the second circuit.

24. The method of claim 17, wherein the power source includes a battery, the method further comprising an act of including the battery in a portable battery pack.

25. The method of claim 24, further comprising an act of connecting the uninterruptible power supply to a second power source, wherein the second power source is a battery power source.

26. The method of claim 17, wherein the signal circuit includes a signal line and a line common to the second circuit and the signal circuit.

27. The method of claim 17, further comprising an act of communicating information from the power source to the uninterruptible power supply with the signal circuit.

28. An uninterruptible power supply, comprising:
UPS circuitry;
a power source adapted to couple to the UPS circuitry;
means adapted to couple a first contact and a second contact of the power source to the UPS circuitry, at a first stage of connection, to form a first circuit configured to provide power from the power source to the UPS; and
means adapted to couple the first contact, the second contact, and a third contact of the power source to the UPS circuitry, at a second stage of connection, to form a second circuit configured to provide power from the power source to the UPS, and a signal circuit,
wherein a voltage is applied from the power source to the UPS circuitry with the second circuit and the second circuit includes the first contact and the third contact, and
wherein information is communicated between the power source and the UPS circuitry with the signal circuit and the signal circuit includes the second contact and the third contact.

29. The uninterruptible power supply of claim 28, wherein the signal circuit is adapted to provide a signal representative of at least one parameter of the power source.

30. The uninterruptible power supply of claim 28, wherein the first circuit includes a current limiting circuit.

31. The uninterruptible power supply of claim 30, wherein the UPS circuitry includes a capacitor, and wherein the current limiting circuit is a precharge circuit adapted to precharge the capacitor.

32. The uninterruptible power supply of claim 31, wherein the capacitor is included in the first circuit and the second circuit.

33. The uninterruptible power supply of claim 28, wherein the power source includes a battery.

34. The uninterruptible power supply of claim 32, wherein the battery is included in a battery pack adapted to connect to the UPS circuitry.

35. The uninterruptible power supply of claim 28, wherein the first circuit is inoperative at the second stage of connection.

36. The uninterruptible power supply of claim 28, wherein the first circuit includes a voltage clamping device configured to conduct current at the first stage of connection, and not conduct current at the second stage of connection.

37. The uninterruptible power supply of claim 36, wherein the voltage clamping device is a transient voltage suppressor.

38. The uninterruptible power supply of claim 28, wherein the means for coupling are included in an electrical cord.

39. A battery pack adapted to couple to a UPS, the battery pack comprising:
a first contact, a second contact, and a third contact adapted to couple the battery pack to the UPS,
wherein the first contact and the second contact are included in a current limiting circuit adapted to apply a first voltage to the UPS at a first stage of connection of the battery pack and the UPS, wherein the first contact and the third contact are included in a power circuit adapted to apply a second voltage to the UPS at a second stage of connection of the battery pack and the UPS, and wherein the second contact and the third contact are included in a signal circuit adapted to conduct a signal to the UPS at the second stage of connection.

40. The battery pack of claim 39, wherein the signal is representative of at least one parameter of the battery pack.

41. The battery pack of claim 39, further comprising a sensing device adapted to provide information concerning a status of the battery pack.

42. The battery pack of claim 39, wherein the second contact and the third contact are adapted to conduct a signal from the UPS to the battery pack.

43. The battery pack of claim 39, wherein the UPS includes a capacitor, and wherein the current limiting circuit is a precharge circuit adapted to precharge the capacitor.

44. The battery pack of claim 43, wherein, at the first stage of connection, the first voltage is applied to the capacitor, and wherein, at the second stage of connection, the second voltage is applied to the capacitor.

45. The battery pack of claim 39, further comprising a portable battery pack.

46. The battery pack of claim 39, further comprising a voltage clamping device configured to conduct current at the first stage of connection, and not conduct current at the second stage of connection.

47. The battery pack of claim 46, wherein the voltage clamping device is a transient voltage suppressor.

48. The uninterruptible power supply of claim 39, wherein the battery pack and the uninterruptible power supply are partially connected at the first stage of connection, and wherein the battery pack and the uninterruptible power supply are fully connected at the second stage of connection.

* * * * *

UNITED STATES PATENT AND TRADEMARK OFFICE
CERTIFICATE OF CORRECTION

PATENT NO.         : 7,573,156 B2
APPLICATION NO.    : 11/315659
DATED              : August 11, 2009
INVENTOR(S)        : Paik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Fourteenth Day of December, 2010

David J. Kappos
*Director of the United States Patent and Trademark Office*